(12) United States Patent
Goyal et al.

(10) Patent No.: US 10,290,047 B1
(45) Date of Patent: May 14, 2019

(54) SELECTION OF ITEMS VIA ITEM-SPECIFIC IMAGE AND ATTRIBUTE INFORMATION

(71) Applicant: Amazon Technologies, Inc., Seattle, WA (US)

(72) Inventors: Dushyant Goyal, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 400 days.

(21) Appl. No.: 15/081,525

(22) Filed: Mar. 25, 2016

(51) Int. Cl.
| | |
|---|---|
| *G06Q 30/00* | (2012.01) |
| *G06Q 30/06* | (2012.01) |
| *G06F 3/0482* | (2013.01) |
| *G06F 3/0484* | (2013.01) |
| *G06Q 10/08* | (2012.01) |

(52) U.S. Cl.
CPC ....... *G06Q 30/0643* (2013.01); *G06F 3/0482* (2013.01); *G06F 3/04842* (2013.01); *G06Q 10/083* (2013.01); *G06Q 30/0633* (2013.01)

(58) Field of Classification Search
CPC .............. G06Q 30/0601; G06Q 30/0641
USPC .............................................. 705/26.1, 27.1
See application file for complete search history.

(56) References Cited

U.S. PATENT DOCUMENTS

| | | | |
|---|---|---|---|
| 2014/0279653 A1* | 9/2014 | Pucca Dias | G06Q 10/0833 705/333 |
| 2016/0171584 A1* | 6/2016 | Cao | G06O 30/0625 705/26.62 |
| 2017/0262932 A1* | 9/2017 | Clark | G06F 17/30312 |

OTHER PUBLICATIONS

Consumer Reports: Five grocery sites that really deliver, Jul. 17, 2015, Pittsburgh Post-Gazette (Year: 2015).*

* cited by examiner

*Primary Examiner* — Brittney N Miller
(74) *Attorney, Agent, or Firm* — Lee & Hayes, P.C.

(57) ABSTRACT

Items, such as produce items, may be placed in containers, imaged, weighed, and stored for subsequent retrieval. Images that depict the items and attributes associated with the items may be presented to customers via an interface. Upon receiving an indication that a customer has purchased one or more items via the interface, a container that includes the one or more items is retrieved. The one or more items are removed from the container and packaged for delivery to the customer. The resulting empty container is refilled with new items, which are then imaged, weighed, and stored.

20 Claims, 7 Drawing Sheets

US 10,290,047 B1

SELECTION OF ITEMS VIA ITEM-SPECIFIC IMAGE AND ATTRIBUTE INFORMATION

BACKGROUND

Consumers are increasingly purchasing items from merchants via online sources, such as a merchant-branded website or an electronic marketplace that offers items on behalf of merchants. When deciding whether to purchase a particular item (e.g., a television, a bicycle, a book, etc.), a consumer may view an image of the item, as well as a written description of the item. Since such items do not vary from one item to the next, a stock image or photograph of the item is sufficient to allow the consumer to make an informed purchasing decision. However, the condition, quality, size, etc., of other items (e.g., fruits, vegetables, meat, etc.) frequently varies between different items. As a result, a stock image that represents that item will not allow the consumer to determine which particular items are being purchased, thereby possibly resulting in a poor customer experience if the items that are actually delivered to the consumer do not meet his/her expectations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
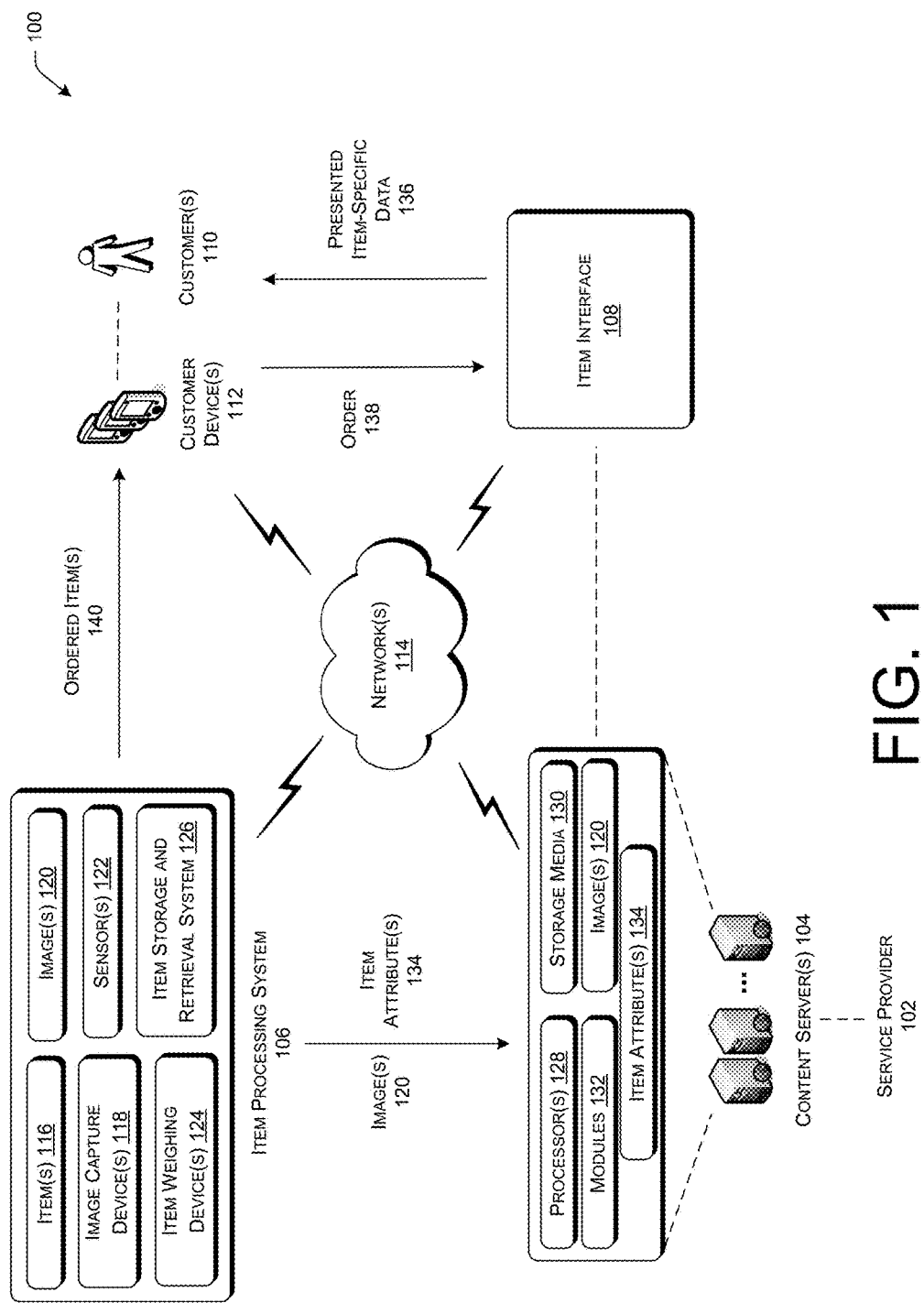
FIG. 1 illustrates an example system for allowing customers to search for and view items that are available to be acquired.

The systems and/or processes described herein relate to capturing data associated with items available for acquisition, and visually presenting images of the items, as well as attributes of the items. In particular, the quality, condition, ripeness, size, etc., of certain items, such as produce (e.g., fruits, vegetables, etc.), meat (e.g., beef, chicken, etc.), etc., may vary from one item to the next. When customers desire to purchase such items online, such as via a website or a mobile application, existing systems typically show a stock image that is representative of the item (e.g., a bunch of carrots, a head of lettuce, etc.). However, existing systems do not visibly display the actual items that are available for acquisition. As a result, customers are not able to determine the condition, quality, ripeness, size, etc., of the items prior to purchasing such items, and may only determine this information when the items are delivered. This may result in a poor customer experience if the delivered items do not meet the expectations of the customer with respect to condition, quality, etc.

Accordingly, the systems and/or processes described herein allow customers to search for, and view, physical items (e.g., fruit, vegetables, etc.) that are available for acquisition. More particularly, items may initially be selected and placed in individual containers, where each container may hold one or multiple items of the same type (e.g., the same type of vegetable, fruit, meat, etc.). For instance, a container may include a bunch of six bananas, two yams of the same size, a few apples of the same variety, ripeness, color, and/or size. Then, one or more image capture devices and/or sensors may capture images of items, and may also determine/obtain other attributes relating to the items (e.g., ripeness, bruising, size, days since the items were picked/harvested, etc.). The weight of the items included in each container may also be determined. The images and corresponding weight of the items in each container may be transmitted to a server associated with a service provider for storage, and subsequent presentation to customers. Moreover, the physical items and corresponding containers are then stored for subsequent retrieval.

In some embodiments the service provider may maintain a website or mobile application that allows customers to search for, view, and acquire items, including the items that were previously imaged, weighed, and stored. Utilizing the website/mobile application, a customer may search for or select a type of items, such as various produce items. In response, the website/mobile application may present one or more images that depict items of the type of produce requested by the customer. For instance, provided that the customer requested bananas, the service provider may present one or more images that depict bananas in different containers, such as a first image that depicts a first number of bananas (e.g., three) of a particular weight, ripeness, color, price, etc., and a second image that depicts a second number of bananas (e.g., five) having a different (or the same) weight, ripeness, color, price, etc. As stated above, the actual items depicted in the images are available for acquisition, such that if the customer selects the first image, or the item(s) (e.g., bananas) depicted in the first image, those exact items will be delivered to the customer. Upon selecting the images, the items associated with the image may be added to the customer's virtual shopping cart. The customer may select multiple images/containers of the same type of item (e.g., bananas), and the total weight, count, volume, price, etc., of that type of item will be updated in the virtual shopping cart. In order to present images of items that are most likely of interest to the customer, the website/mobile application may allow the customer to filter the items by type, weight, ripeness, quantity, size, color, and so on. Based on the information provided by the customer, the system may identify items and corresponding images that are responsive to that information.

Upon determining that the customer has finalized his/her order, the particular items selected by the customer may be determined. Since the items and containers each include identifiers that are associated with one another (e.g., an item identifier being associated with a container identifier, and vice versa), and as a result of the container identifier being associated with a particular location within the storage and retrieval system (possibly represented by a storage identifier), the specific items ordered by the customer may be accessed and retrieved. The items may then be packaged for delivery to the customer. The resulting empty container may then be re-stocked with additional items, which may or may not be the same type of items ordered by the customer. The new items may then be analyzed/processed using the image capture devices and/or sensors, and an image of the items may be provided to the server so that the image may be added to the repository of images that represent items that are available for acquisition by customers. The new items included in the previously empty container may then be stored for subsequent retrieval, such as when a customer has indicated an intent to purchase the new items.

FIG. 1 illustrates an example system 100 for analyzing items that are available for acquisition to customers, and presenting images, and corresponding attributes, of the items. As shown in FIG. 1, the system 100 may include a service provider 102, one or more content servers 104 associated with the service provider 102, an item processing system 106, an item interface 108 associated with the service provider 102, one or more customers 110, and customer devices 112 associated with the customers 110. The service provider 102, the item processing system 106, and the customer devices 112 may communicate via one or more networks 114.

In various embodiments, the service provider 102 may offer items 116 (e.g., products, services, etc.) to the customers 110 via the item interface 108, which may correspond to an electronic marketplace (e.g., a website, a mobile application, a graphical user interface, etc.) associated with the service provider 102. That is, the customers 110 may access the item interface 108 via corresponding customer devices 112 for the purpose of searching for, viewing, selecting, acquiring (e.g., purchasing, leasing, renting, borrowing, lending, etc.), etc., the items 116. The items 116 may be provided directly by the service provider 102, or may be provided by the service provider 102 on behalf of a different entity, such as one or more merchants. That is, via the item interface 108 (e.g., a website, an electronic marketplace, and/or a mobile application associated with the service provider 102), the customers 110 may place orders for items 116 to be provided by the service provider 102 and/or merchants. As will be described in additional detail below, the service provider 102 may, via the item interface 108, visually present images that depict the specific items 116 that are available for acquisition, and may present attributes associated with those items 116.

The item processing system 106 may correspond to a physical location in which the items 116 are received, manufactured, produced, analyzed, stored, and/or packaged for delivery to customers 110. For the purpose of this discussion, the items 116 may include any type of good or product in which the quality, condition, weight, size, ripeness, may vary from one item 116 to the next. For instance, the items 116 may include perishable items 116, such as produce items 116 (e.g., fruit, vegetables, etc.) or meat items 116 (e.g., beef, chicken, etc.). Accordingly, the items 116 may be referred to as "non-standardized items," which may correspond to produce (e.g., fruits, vegetables, etc.), meat (e.g., chicken, beef, pork, fish, etc.), loose items 116 (e.g., fruits, vegetables, nuts, meat, etc.), and/or other perishable items that are not included in standardized packaging (e.g., cans, plastic/glass jars, boxes, plastic wrappers, bags, etc.).

The following example highlights a distinction between the items 116 described herein, and other items 116 that are available for acquisition. Such other items 116 may include electronics (e.g., a television), books, a bicycle, or any other type of item 116 in which the items 116 are virtually identical. For instance, if two different customers 110 purchased the same television (e.g., same make, model, brand, etc.), the television received by each customer 110 would be identical. However, if those same two customers 110 each ordered a bunch of bananas, the condition, quality, ripeness, color, size, quantity, etc., of the bananas received by the two customers 110 may vary significantly. For instance, a first bunch of bananas received by the first customer 110 may include five bananas having a weight of 1.0 lb, and the quality/condition of the bananas may be good (e.g., yellow in color, firm, little to no bruising, etc.). A second bunch of bananas received by the second customer 110 may include three bananas having a weight of 0.5 lbs and the condition/quality of the bananas may be considered to be poor (e.g., brownish in color, significant bruising, mushy portions, etc.). Accordingly, although the type of items 110 is the same (e.g., bananas), the condition and/or quality of the items 110 is significantly different. Unless otherwise stated, the items 110 discussed herein may correspond to items 110 that may vary from one item 110 to the next item 110 of the same type.

As a result, the item processing system 106 allows the customer 110 to view specific items 110, such as fruits and/or vegetables, that he/she may purchase. To do so, the item processing system 106 may include one or more image capture devices 118 that may capture images 120 of the items 116. As will be described in additional detail with respect to FIG. 2, the image capture device(s) 118 may capture an image 120 of one or more items 110 included in each of multiple containers or other mechanisms that are configured to hold the items 116. The item processing system 106 may also include one or more sensors 122 that sense or obtain various types of data or attributes regarding the items 116. The containers and corresponding items 116 may be placed or moved under, over or by the image capture device(s) 118 and/or the sensor(s) 122 using an automated transport system, such as one or more conveyors or conveyor belts that move or transport the containers/items 116 from a first location to a second, different location. In addition, the item processing system 106 may include one or more item weighing devices 124, such as a scale, that measure or otherwise determine a weight of the items 110 included in the containers. For instance, the containers with the items 116 may be placed on a scale that has been zeroed to take into consideration the weight of the container itself. The item weighing device(s) 124 may also determine the total weight of the container/items 116, and then subtract the weight of the container from the total weight to determine the weight of the items 116.

The item processing system 106 may also include an item storage and retrieval system 126. In particular, after the items 116 are imaged, weighed, etc., the containers including the items 116 may be stored in a separate location, which may be of a controlled temperature (e.g., refrigerated) depending on the type of the items 116. The items 116 may be stored until a customer has ordered/selected/purchased the items 116 included in a particular container, which may cause the item storage and retrieval system to locate and retrieve the container that includes the ordered items 116. The ordered items 116 may be packaged for delivery to the customer 110, and the resulting empty container may be re-stocked with additional items 116, which may then be imaged, weighed, and stored by the item processing system 106.

The content server(s) 104 of the service provider 102 may contain any number of servers that are possibly arranged as a server farm, although other server architectures may also be used to implement the content servers 104. Moreover, as shown, the content server(s) 104 may include one or more processors 128, storage media 130, such as computer-readable media, and one or modules 132. The processor(s) 128 may execute the one or more modules 132 and/or processes to cause the content server(s) 104 to perform a variety of functions, as set forth above and explained in further detail in the following disclosure. In some embodiments, the processor(s) 128 may include a central processing unit (CPU), a graphics processing unit (GPU), both CPU and GPU, or other processing units or components known in the art. Additionally, each of the processor(s) 128 may possess its own local memory, which also may store program modules, program data, and/or one or more operating systems.

The storage media 130 may include volatile memory (such as RAM), non-volatile memory (such as ROM, flash memory, miniature hard drive, memory card, or the like), or some combination thereof. The storage media 130 may be non-transitory computer-readable media. The storage media 130 may include, or be associated with the one or more modules 132 that perform various operations associated with the content server(s) 104. In some embodiments, the one or more modules 132 may include or be associated with computer-executable instructions that are stored by the storage media 130 and that are executable by the processor(s) 128 to perform such operations. In various embodiments, the storage media 130 may store the images 120 of the items 116, as well as other information/data/attributes 134 associated with the items 116. The content server(s) 104 may also include additional components not listed above that may perform any function associated with the content server(s) 104.

As shown in FIG. 1, the images 120 that depict the items 116 may be sent from the item processing system 106 to the service provider 102 and stored at the content server(s) 104. In addition, item attributes 134 associated with the items 116 may also be stored by the content server(s) 104. The item attributes 134 may be determined using the image capture device(s) 118, the sensor(s) 122 and/or the item weighing devices 124, and/or may be determined from the images 120 and/or the data obtained by the sensor(s) 122. The item attributes 134 may be determined by the item processing system 106 and/or the service provider 102 and may include any information that relates to the items 116. Examples of the item attributes 134 may include the quality and condition of the items 116, such as the ripeness, the existence of bruising/spots, the color, and so on. The item attributes 134 may also include the weight, size, quantity, price, etc., of the items 116. One or more of the item attributes 134 may be presented to customers 110 via the item interface 108 when the customers 110 search for, view, select, purchase, etc., such items 116. As shown in FIG. 1, some or all of the item attributes 134 may be determined by the item processing system 106 and transmitted to the content server(s) 104. Some or all of the item attributes 134 may also be determined by the service provider 102 and stored at the content server(s) 104.

Upon receiving a request from a customer 110 for a particular item 116, the service provider 102 may present/display one or more images 120 of the item(s) 116, as well as one or more item attributes 134 relating to the item(s) 116 (i.e., presented item-specific data 136). For instance, provided that the customer 110 searched for or requested bananas, the presented item-specific data 136 may include one or more images 120 that depict bananas of varying weight, quantity, ripeness, color, price, etc. The presented item-specific data 136 may also include various item attributes 134 relating to the item(s) 116, which may include the type, weight, quantity, source, etc., of the item(s) 116. That is, based on the presented item-specific data 136, the customer 110 may select which specific bananas that he/she would like to order, thereby allowing the customer 110 to know the condition, quality, quantity, ripeness, etc., of the bananas prior to making a purchase. Upon the customer 110 placing an order 138 for items 116 via the item interface 108, which may include a website, an electronic marketplace, a mobile application, etc., the ordered items 140 may be retrieved from the item storage and retrieval system 126 and delivered to a physical location associated with the customer 110 (e.g., a residence, workplace, etc.).

For the purpose of this discussion, the customers 110 may include any person or entity that interacts with the service provider 102 for the purpose of ordering, acquiring, purchasing, etc., items 116 from the service provider 102. The customers 110 may interact with the service provider 102 and/or the item interface 108 via corresponding customer devices 112, which may include cellular telephones, tablet devices, laptop computers, desktop computers, gaming consoles, electronic book (eBook) reader devices, and so on. Moreover, the network(s) 114 may facilitate communications and/or interactions between the content server(s) 104 of the service provider 102, item interface 108, and/or the customer devices 112 associated with the customers 110. The network(s) 112 may facilitate such communications/interactions via any type of network, such as a public wide-area-network (WAN) (e.g., the Internet), which may utilize various different technologies including wired and wireless technologies.

A criterion for buying perishable items 116, such as fruits, vegetables, meat, etc., is the physical evaluation of the items 116 for freshness, ripeness, quality, hardness, texture, color, etc. Such a physical evaluation can be performed by customers 110 in a physical setting, such as a grocery store, a farmer's market, a produce stand, etc. However, existing online systems do not allow customers 110 to evaluate such items 116 prior to making a purchase. Instead, online providers of produce items 116 merely present a generic image or photograph of the item 116 in association with a description of the item 116. This stock image or photograph informs the user 110 of the type of item 116, but not of the quality, condition, ripeness, size, etc., of the item 116. In fact, there does not appear to be any connection between the representation of the item 116 depicted in the image/photograph and the actual items 116 that will be delivered to the customer 110. For instance, an image/photograph of a banana does not indicate whether bananas ordered by the customer 110 are ripe enough for consumption over the next several days, contain brown or mushy portions, and so on.

Not only are customers 110 unaware of the condition and/or quality of the items 116 they are purchasing, but online providers of such items 116 have also been unable to convey such information to customers 110 in an online setting. Accordingly, online providers have been unable to provide sufficient amount of information to allow customers 110 to decide whether they would like to purchase items 116, and what stage of ripeness or condition they would prefer their produce to be. Such a technical problem may result in the customer 110 not being satisfied with the quality and/or condition of purchased items 116, the return of such items 116, and an overall poor customer experience. This may also result in higher costs for the provider of the items 116 and a decrease in sales.

The inability of online providers to display specific items 116 that are available to be acquired is alleviated by the systems and processes described herein. Since the service provider 102 is able to present, via the item interface 108, images 120 of items 116 that are available for purchase and that will be delivered to the customer 110 (provided that the customer 110 purchases those items 116), the customer 110 is aware of the condition, quality, ripeness, color, size, etc., of the items 116 that are ordered. Customers 110 are able to select the specific items 116 that they want, and order those specific items 116. If the items 116 depicted in an image 120 are not desired by the customer 110, the customer 110 may elect to view a different image 120 that includes similar, yet possibly different, items 116 of the same type, or of different types.

Figure 2:
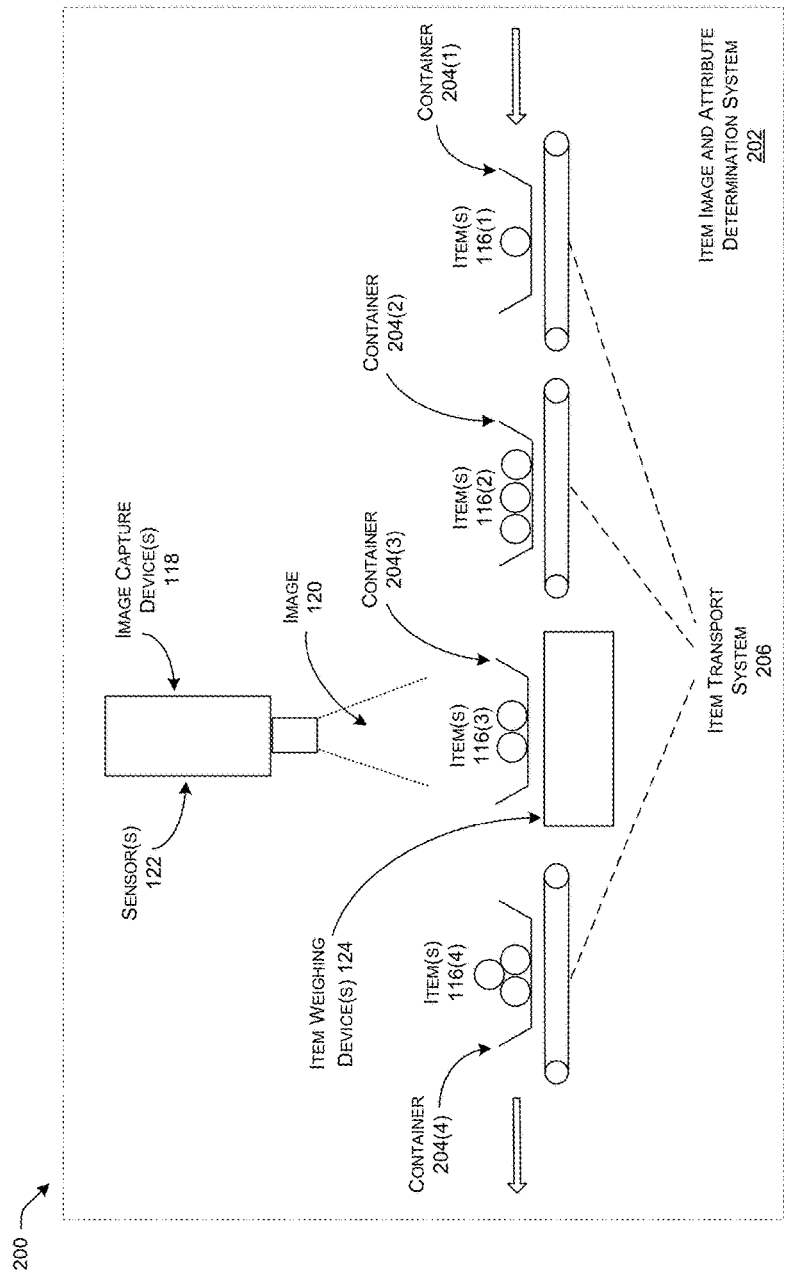
FIG. 2 illustrates an example system for capturing data associated with items that are available for acquisition.

FIG. 2 illustrates an example system 200 for analyzing and/or imaging items that are available for acquisition by customers. As shown, the diagram/system 200 includes an item image and attribute determination system 202, which may be part of the item processing system 106 illustrated in FIG. 1. The item image and attribute determination system 202 may include one or more image capture devices 118, one or more sensors 122, one or more item weighing devices 124, one or more containers 204 that contain or hold the items 116, and/or an item transport system 206. The item image and attribute determination system 202 may transport the containers 204 such that images 120 of the items 116 included in each container 204 can be captured, determine various types of data associated with the items 116, determine item attributes 134 of the items 116 based on the images 120 and/or the data, transport the containers 204 to the item storage and retrieval system 126, and/or transmit the images 120 and the item attributes 134 to the service provider 102 and/or the content server(s) 104.

As will be discussed in additional detail with respect to FIG. 3, any number of items 116 may be placed in individual containers 204. The items 116 placed in a particular container 204 may be of the same type (e.g., bananas, apples, etc.), and may be of similar quality, condition, ripeness, size, etc. Moreover, different containers 204 that include the same type of items 116 may include items 116 that are similar (e.g., similar size, quantity, ripeness, weight, etc.) or different. For instance, items 116 placed in a container 204 may be based on the type of the items 116 (e.g., carrots are placed in the same container 204), the size of the items 116 (e.g., similarly sized carrots are placed together), ripeness (e.g., carrots of similar ripeness are placed together), and so on. For the purpose of this discussion, the containers 204 may include any mechanism that is able to hold the item(s) 116, such as, for example, a tray, plate, bowl, rack, sheet, bag, tote, basket, and so on. As shown in FIG. 2, the item image and attribute determination system 202 includes multiple containers (i.e., containers 204(1)-204(4)), and each container 204 may include any number of items 116 in any type of configuration. For instance, container 204(1) includes a single item 116(1), container 204(2) contains three items 116(2), container 204(3) contains two items 116(3), and container 204(4) also contains three items 116(4) in a different configuration as compared to container 204(2). In some embodiments, the items 116 may be configured such that the image capture device(s) 118 and the sensor(s) 122 may view or access each of the items 116 included in the container 204. For instance, the items 116 may be arranged such that one item 116 isn't obscuring one or more other items 116.

The items 116 included in a particular container 204 may be assigned an item identifier that uniquely identifies those items 116, where the item identifier may include any combination of numbers, letters, symbols, etc. Associated with the item identifier for one or more items 116 is information associated with the item(s) 116. This information may include the type of the item(s) 116 (e.g., apple, banana, broccoli, etc.), a source of the item(s) 116 (e.g., a farm where the item(s) 116 were picked or harvested), whether the item(s) 116 are organic, a date in which (or an amount of time since) the item(s) 116 were picked or harvested, a date in which (or an amount of time since) the item(s) 116 were received by the item processing system 106, nutritional value of the item(s) 116 (e.g., calories, vitamins, sugar content, fiber content, fat content, etc.), a ripeness of the item(s) 116 (e.g., a value that indicates a ripeness level), and any other relevant information. Moreover, each container 204 may be associated with a container identifier (any combination of letters, numbers, symbols, etc.), and the container identifier may be included on its corresponding container 204. The container identifier of a container 204 and/or the item identifier associated with the item(s) 116 included in that container 204 may be visible to the image capture device(s) 118. When items 116 are placed in a particular container 204, the service provider 102 may associate the item identifier for those items 116 with the container identifier of that container 204, and this association may be stored by a computing device associated with the item image and attribute determination system 202 and/or the content server(s) 104. As a result, the service provider 102 may be able to determine and track which items 116 are included in which container 204.

In various embodiments, the item transport system 206 may transport or move the containers 204 in one or more directions. In particular, the item transport system 206 may transport the containers 204 such that the items 116 included in the containers 204 are in view of, or within range of, the image capture device(s) 118 and/or sensor(s) 122. The item transport system 206 may also transport/move the containers 204 such that the containers 204 are situated, or resting, on the item weighing device(s) 124. For instance, the item transport system 206 may transport the containers 204 from a first location in which the items 116 are placed in the containers 204 to a second location at which the items 116 are imaged, sensed and/or weighed. The item transport system 206 may move the containers 204 at a predetermined speed, or at variable speeds. Moreover, the item transport system 206 may cause the containers 204 to cease moving so that an image 120 and/or weight of the items 116 included in the containers 204 can be captured/determined at the second location. Once this is performed, the item transport system 206 may resume movement to cause the next container to be imaged/weighed at the second location. In some embodiments, the item transport system 206 may stop transporting the containers 204 for a predetermined amount of time (e.g., five seconds) or an amount of time that is sufficient to capture an image 120 of the corresponding items 116, to obtain data regarding the items 116 (e.g., by the sensor(s) 122), and/or to determine a weight of the items 116.

The item transport system 206 may include any type of mechanism that is configured to move the containers 204 to and from multiple different locations such that each container 204 can be imaged, sensed and/or weighed by the image capture device(s) 118, the sensor(s) 122 and the item weighing device(s) 124, respectively. For instance, the item transport system 206 may include a conveyor system (e.g., a belt conveyor system) that includes one or more conveyor belts that move the containers 204 horizontally, or with a slight amount of incline/decline. When placed on the conveyor/conveyor belts, and when in operation, the conveyor/conveyor belts move the containers 204 within the item image and attribute determination system 202. The belt conveyor system may include two or more pulleys (also referred to as "drums") with an endless loop of carrying medium (e.g., the conveyor belt) that rotates around the pulleys. One or both of the pulleys are powered using a motor (e.g. an electrical motor), thereby moving the belt and the material on the belt forward or backwards. In some embodiments, the conveyor belt can be a slide and be controlled by the force of gravity. Other types of conveyor systems (in addition to belt conveyers) that could be used to transport the containers 204 may include gravity conveyors, gravity skatewheel conveyors, wire mesh conveyors, plastic belt conveyors, flexible conveyors, vertical conveyors, spiral conveyors, vibrating conveyors, pneumatic conveyors, belt driven live roller conveyors, lineshaft roller conveyors, chain conveyors, screw or auger conveyors, overhead conveyors, dust proof conveyors, overland conveyors, and/or drag conveyors, to name a few. However, it is contemplated that the item transport system 206 may include other mechanisms and/or devices to move the containers 204. For instance, the item transport system 206 may include mobile robots that pick up the containers 204, move the containers 204 between locations (e.g., from a first location to a second location), and/or then place the containers 204 in a location for subsequent storage and retrieval. In additional embodiments, the mobile robots may move shelving units, which hold one or more containers 204, between locations.

As stated above, each container 204 may be situated such that the image capture device(s) 118 may capture an image 120 of the item(s) 116 included in the container 204. Here, the image capture device(s) 118 may capture an image 120 of container 204(3) and items 116(3). In addition, the sensor(s) 122 may obtain various types of data relating to the items 116(3) and the item weighing device(s) 124 may determine the weight of the items 116(3) or a combination of the items 116(3) and the container 204(3). Once the above information is obtained, the item transport system 206 may move/transport the next container 204 (i.e., container 204(2)) such that the image capture device(s) 118, the sensor(s) 122, and the item weighing device(s) 124 may obtain data regarding items 116(2). That is, the item transport system 206 may transport each container 204 to a particular location at which the image capture device(s) 118 captures an image 120 of the item(s) 116, the sensor(s) 122 obtain data relating to the item(s) 116, and/or the item weighing device(s) 124 determine a weight of the item(s) 116. Once this data is obtained, the container 204 may be transported to a different location, and the next container 204 may be transported and stopped at the particular location. This process may occur for each subsequent container 204 and corresponding item(s) 116.

The image capture device(s) 118 may include any type of camera, such as an RGB camera that captures RGB images 116, a depth camera that captures three-dimensional (3D) images 116 (e.g., a depth map), an infrared (IR) camera that captures IR images 116, a laser scanner, a spectrometer that determines a spectroscopy of the items 116, and so on. From the data captured by the image capture device(s) 118 and/or the sensor(s) 122, the color, size, shape, etc., of the items 116 may be determined. The ripeness and any areas of poor condition of the items 116 (e.g., bruising, discoloration, etc.) may also be determined.

The sensor(s) 122 may include any type of sensor 122 that may be used to obtain information about the items 116. For instance, the sensor(s) 122 may include one or more IR sensors, spectroscopy sensors, carbon dioxide sensors, olfactory sensors (e.g., an olfactometer), oxygen sensors, and so on. For instance, since riper fruits may emit a greater amount of carbon dioxide, a carbon dioxide sensor 122 may detect carbon dioxide levels associated with the item(s) 116, thereby allowing the system to determine a ripeness level of the item(s) 116. Moreover, carbon dioxide emitted by different items 116 may be compared to determine the relative ripeness of different items 116. The ripeness and condition of some item(s) 116 (e.g., bananas) may be determined by their appearance. For instance, a green colored banana is not considered to be ripe, and brown portions of the banana may indicate areas that are in poor condition. However, it may be difficult to determine the ripeness or condition of other items 116, such as an avocado. The avocado may be brownish-green in color, and appear to be ripe and in good condition. However, data relating to the avocado and obtained by the sensor(s) 122 may indicate that the avocado is under-ripe, overly ripe, or has portions that are in poor condition (e.g., brown portions, etc.). For the purpose of this discussion, the image capture device(s) 118 and the sensor(s) 122 may be included in the same device, or in different devices.

In addition, data other than image data and data obtained by the sensor(s) 122 may be used to determine the condition or ripeness of items 116. For instance, a time at which the items 116 were picked or harvested, whether the items 116 have been refrigerated, chemicals or other substances applied to the items 116, etc., may indicate the ripeness and/or quality of the items 116.

As shown in FIG. 2, the image capture device(s) 118 and the sensor(s) 122 are situated over the containers 204 that hold and transport the item(s) 116, resulting in an overhead image capture device(s) 118/sensor(s) 122 system. However, any configuration is contemplated, provided that the image capture device(s) 118 is able to capture an image 120 that depicts each of the items 116 included in the container, and assuming that the sensor(s) 122 are able to obtain data relating to each of the items 116 included in the container 204. In these embodiments, the image 120 and data relating to the items 116 may be captured/obtained while the container 204 is positioned at a particular location.

In additional embodiments, the item weighing device(s) 124 may include a scale or other mechanism to determine the weight of the items 116. In certain embodiments, the item weighing device(s) 124 may be situated below the image capture device(s) 118 and the sensor(s) 122 such that the weight of the items 116 can be determined at a time at which an image of the items 116 is captured. However, other configurations of the item weighing device(s) 124 in relation to the image capture device(s) 118 and/or the sensor(s) 122 is contemplated. As shown, the weight of the items 116 may be determined when the container 204 is positioned at the particular location referenced above.

The item weighing device(s) 124 may determine the total collective weight (e.g., in pounds, grams, etc.) of the items 116 included in a particular container 204. In one embodiment, the item weighing device(s) 124 may be zeroed to take into consideration the weight of the container 204. As a result, the weight measured by the item weighing device(s) 124 may represent the weight of the item(s) 116 themselves. In another embodiment, the item weighing device(s) 124 may determine the total combined weight of the item(s) 116 and the container 204, and then the weight of the container 204 may be subtracted from the combined weight in order to determine the weight of the item(s) 116 included therein. In either scenario, a collective weight of the item(s) 116 is measured. Here, the item(s) 116 included in a particular container 204 may constitute a single unit for purchase by customers 110. That is, a customer 110 may select to purchase all of the items 116 in the container 204 for purchase, as opposed to selecting for purchase individual items 116 of multiple items 116 included in the container 204. In this embodiment, the customer 110 may purchase all of the items 116 included in the container 204, or elect to purchase none of these items 116.

In other embodiments, the item image and attribute determination system 202 may determine the weight of individual items 116 included in the containers 204. For instance, the number of items 116 included in a particular container 204 may be known, such as by storing the number of items 116 that were initially placed in the container 204, or using the image 120 of the items 116 or the data obtained by the sensor(s) 122 to determine the number of items 116 included in the container 204. The item weighing device(s) 124 may determine the total combined weight of the items included in the container 204. Since the items 116 included in the container 204 are likely to be of similar size, the weight of each individual item 116 included in the container 204 may be determined by dividing the combined weight of the items 116 by the number of items 116 included in the container 204. For instance, if the combined weight of the items 116 in the container is 1.5 lbs, and there are three similarly sized items 116 included in the container, the estimated weight of each item 116 is 0.5 lbs (1.5 lbs/3 items=0.5 lbs/item).

Alternatively, or in addition, the weight of each item 116 included in a container 204 may be determined based on the estimated size/shape of each item 116, which may be determined via the image 120 captured by the image capture device(s) 118 and/or the data obtained by the sensor(s) 122. For instance, the total combined weight of the items 116 may be determined, and then the weight of each item 116 may be determined by its respective size/shape. As an illustrative example, assume that the container 204 includes two apples—a first apple that appears to be twice as large as a second apple. If the total combined weight of the two apples is determined to be 0.6 lbs, it may be determined that the first apple is approximately 0.4 lbs, and the second apple is approximately 0.2 pounds.

By determining the weight of individual items 116 included in the containers 204, customers 110 may view the images 120 of the items 116 and select individual items 116 that they would like to purchase, such as by selecting the items 116 of interest via the image 120 presented via the item interface 108. As a result, the customer 110 may purchase some, but not all, of the items 116 included in a particular container 204. Since the content server 104 may store item identifiers associated with the items 116 included in a container 204, or item identifiers associated with each individual item 116 included in the container 204, the service provider 102 may determine which item(s) 116 the customer 110 has selected for purchase. The selected items 116 may then be manually selected from the container 204, or a mechanical/robotic arm may select the ordered items 116. In other embodiments, a single item 116 may be placed in each container 204 so that customers 110 may select and purchase individual items 116, as opposed to a group of items 116 included in a single container 204.

The image capture device(s) 118, the sensor(s) 122, and/or the item weighing device(s) 124 may include, or may be associated with, a computing device that is configured to transmit and receive data to/from the content server(s) 104 of the service provider 102. In other embodiments, the image capture device(s) 118, the sensor(s) 122, and/or the item weighing device(s) 124 may be configured to transmit the images 120 and item attributes 134 to the content server(s) 104. As a result, the images 120 captured by the image capture device(s) 118, the data obtained by the sensor(s) 122, and/or the weights determined by the item weighing device(s) 124 may be transmitted to the content server 104. Moreover, such information may be associated with the item identifier for the item(s) 116 and/or the container identifier of the container 204 that includes the item(s) 116.

Although attributes associated with the items 116 (e.g., ripeness, size, shape, freshness, condition, etc.) may be determined based on images 120 captured by the image capture device(s) 118 and/or data obtained by the sensor(s) 122, the item attributes 134 may also be determined using one or more algorithms, such as computer vision algorithms. For instance, the content server(s) 104 may use one or more computer vision algorithms to determine the condition or quality of the items 116, which may include any bruising, the stage of ripeness, and/or discoloration (e.g., portions that are a different color than what is typically expected of the item 116). The computer vision algorithms may also be utilized to differentiate between items 116 included in the containers 204, estimating the size of the items 116, determining the number of items 116 included in the containers 204, and so on. Examples of such computer vision algorithms may include segmentation and/or reconstruction algorithms, such as super-pixel algorithms, active-contour algorithms, region growing algorithms, and neural networks (e.g., deep neural networks, convolutional neural networks, etc.), to name a few.

Figure 3:
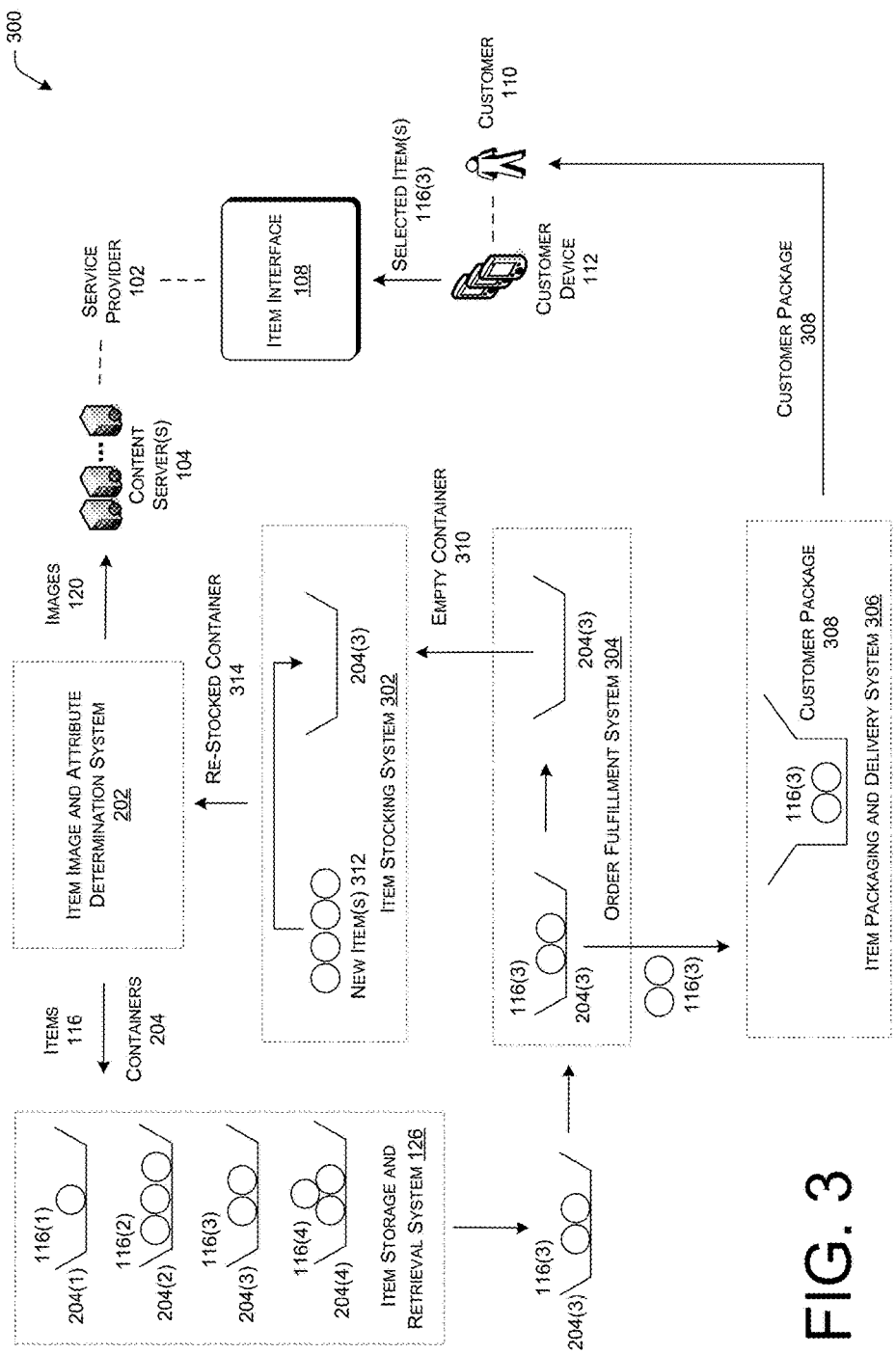
FIG. 3 illustrates an example system for analyzing and storing items for acquisition, retrieval, and delivery to a customer.

FIG. 3 illustrates an example system 300 for analyzing and storing items that are available for purchase, as well as retrieving and facilitating delivery of items upon being purchased by a customer. As shown in FIG. 3, the system 300 may include the item image and attribute determination system 202 described above with respect to FIG. 2, the item storage and retrieval system 126, an item stocking system 302, an order fulfillment system 304, and an item packaging and delivery system 306. Although one or more of the item image and attribute determination system 202, the item storage and retrieval system 126, the item stocking system 302, the order fulfillment system 304, and the item packaging and delivery system 306 may be located at different physical locations, for the purpose of this discussion, such systems may be located at the same physical location, such as a warehouse, an item fulfillment center, and so on. Moreover, the above systems may be located remotely from the content server(s) 104 of the service provider 102, yet such systems may nonetheless be associated with the service provider 102.

In various embodiments, the item stocking system 302 may receive items 116 (e.g., fruit, vegetables, meat, etc.) that will be available for purchase by customers 110. Along with the items 116 may be included certain item attributes 134 relating to the items 116, such as the type (e.g., apples, yams, etc.), whether the items 116 are organic, a source of the items 116 (e.g., a particular farm in which the items 116 were picked or harvested), a date corresponding to when the items 116 were picked/harvested, and so on. The item stocking system 302 may place individual items 116 in containers 204 for subsequent analysis by the item image and attribute determination system 202. For instance, similar items 116 may be placed in the same container 204. In particular, items 116 of the same type and size, items 116 from the same source, organic/non-organic items 116, items 116 of similar ripeness, etc., may be placed in the same container 204. In some embodiments, two items 116 are determined to be of a similar size if their sizes (e.g., circumference, length, width, girth, etc.), shapes, weight, etc., are within a threshold amount. As a result, each container 204 may include a single item 116 or multiple items 116 that are of similar size, ripeness, condition, quality, etc. As stated above, items 116 within the same container 204 may be assigned the same item identifier, and the item identifier may be associated with the container 204 in which the items 116 are placed, where the association between the item identifier and the container identifier may be stored by the content server(s) 104. The items 116 may be manually placed in the containers 204, or an automated system may be used. For instance, one or more robots, robotic arms, conveyor systems, etc., may select the items 116, place the items 116 in corresponding containers 204, and transport the stocked containers 204 to the item image and attribute determination system 202 for analysis and processing.

As described with respect to FIG. 2, the items 116 included in each container 204 may be imaged, analyzed using the sensor(s) 122, and/or weighed. The image(s) 120, item attributes 134, and weight corresponding to one or more items 116 may be associated with the item identifier of the item(s) 116, and then stored by the content sever(s) 104. The items 116 included in the containers 204 may then be transported to, and stored within, the item storage and retrieval system 126. The containers 204 and corresponding items 116 may be placed on one or more shelves, racks, etc., within the item storage and retrieval system 126 using a manual process, or by use of one or more robots, robotic arms, conveyor systems, lift systems, and so on. Moreover, different areas of the item storage and retrieval system 126 may have a controlled temperature (e.g., room temperature, refrigerated, etc.), and containers 204 of items 116 may be placed in such areas based on item type.

In certain embodiments, different areas of the item storage and retrieval system may have or be associated with different storage identifiers, such that a particular storage identifier may indicate a location in which a particular container 204 is currently being stored. When a container 204 is placed in a location in the item storage and retrieval system 126, the storage identifier of that location is associated with the container identifier of the container 204. This association may be stored by the content server(s) 104 or a computing device associated with the item storage and retrieval system 126. As a result, when a customer 110 purchases one or more items 116, the system may determine the container 204 in which the items 116 are included based on the association between the item identifier of the one or more items 116 and the container identifier of the container 204. Moreover, based on an association or mapping between the container identifier and the storage identifier that indicates the location of the container 204 within the item storage and retrieval system 126, the container 204 may be quickly and efficiently retrieved (e.g., using a robot, robotic/mechanical arm, conveyors, lift systems, etc.).

For example, FIG. 3 illustrates that a customer 110 has selected one or more items 116 (i.e., selected item(s) 116(3)) via the item interface 108 using his/her customer device 112. As shown, the customer 110 has selected item(s) 116(3), which are contained in container 204(3), and which were previously stored in the item storage and retrieval system 126. Based on the item identifier of the selected item(s) 116(3), the service provider 102 may determine the container 204 that stores the selected item(s) 116(3) based on the association or mapping between the item identifier and the container identifier of the container. Based on the container identifier, the service provider 102 may determine the location at which the container 204 is stored within the item storage and retrieval system 126. The container 204 that includes the selected item(s) 116(3) may be retrieved using a manual process. Alternatively, or in addition, the selected item(s) 116(3) may be retrieved using a robot or robotic/mechanical arm, possibly using a lift system, and then placed on a conveyor system or other transport system for order fulfillment, packing, and delivery to the customer 110.

As discussed above, although any of the items 116 included in the containers 204 may be purchased by a customer 110, the selected item(s) 116(3) may correspond to items 116(3) included within container 204(3), which is represented by the arrow extending downward, and away from, the item storage and retrieval system 126. Upon the selected item(s) 116(3) being retrieved, the order fulfillment system 304 may facilitate fulfillment of the order placed by the customer 110. For instance, the container 204(3) that includes the selected item(s) 116(3) may be transported to the order fulfillment system 304, either manually or via an automated process. Using an automated process, the container 204(3) may be transported via a robot or conveyor system. The order fulfillment system 304 may remove the selected item(s) 116(3) from the corresponding container 204(3) via a manual process or using a robotic/mechanical arm. The item packing and delivery system 306 may then place the items 116(3) in a customer package 308 that is to be delivered to the customer 110. The customer package 308 may include the selected item(s) 116(3), as well as any packaging materials (e.g., tissue paper, bubble wrap, plastic wrap, ice packs, etc.) that is based on the type of the selected item(s) 116(3), that will prevent the selected item(s) 116(3) from being damaged during delivery, and/or that will cause the selected item(s) 116(3) to remain fresh or in good condition (e.g., ice packs for items 116 that typically need to be refrigerated or frozen). The customer package 308 that includes the selected item(s) 116(3) may then be delivered to a physical location associated with the customer 110, such as a residence, a workplace, etc.

Since the selected item(s) 116(3) were removed from their corresponding container 204 (e.g., container 204(3)), the container 204(3) is currently empty (i.e., empty container 310). The empty container 310 (e.g., container 204(3)) may be transported to the item stocking system 302 so that one or more new item(s) 312 may be placed in the empty container 310. Accordingly, via a manual process and/or by using one or more robots, robotic/mechanical arms, conveyor systems, the empty container 310 may be transported to the item stocking system 302 to be restocked with new items 312. Then, the entire process described above can be repeated with respect to the newly filled containers 204 (i.e., re-stocked container 314). For instance, the re-stocked container 314 may be imaged, weighed, etc., and stored in the item storage and retrieval system 126 for subsequent retrieval upon a customer 110 purchasing the items 116 included in that container 204.

In various embodiments, the new items 312 that are being placed in the empty container 310 may be the same as, or may be different from, the items 116 (e.g., item(s) 116(3)) that were previously included in that container 204 (e.g., container 204(3)). The new item(s) 312 may also include bundles of items(s) 116 of the same type or of different types, such as bananas and apples. Accordingly, the new items(s) 312 may be of any type, may be of multiple different types, and/or may be of any quantity.

Provided that the items 116 stored by the item storage and retrieval system 126 include perishable items 116, such as fruit, vegetables, and/or meat, the items 116 will undergo changes in their ripeness, freshness, and overall condition. Such changes may be manifested in changes in color, texture, shape, odor, weight, etc. For instance, an unripe banana may be green in color, turn yellow when ripe, and eventually turn brown when overripe. Accordingly, items 116 included in containers 204 that have already been imaged, sensed, weighed, etc., may be re-imaged, re-sensed or re-weighed at a later time. That is, images 120 of the items 116 may be retaken, attributes of the items 116 may be re-sensed, and weights of the items 116 may be re-measured periodically as the appearance of the items 116 change and as the items 116 become riper. This may occur at predetermined times (e.g., every two days), which may be based on the type of the items 116 since certain items 116 ripen at different rates. The re-imaging, re-sensing and re-weighing of the items 116 may also be based on a visual inspection of the items 116, and based on a comparison of the current appearance of the items 116 and the appearance of the items 116 in the previously taken images 120. In certain embodiments, the stored containers 204 may be again cycled through the item image and attribute determination system 202, and the resulting images 120, weights, and item attributes 134 may be associated with the item identifiers for those items 116, and transmitted to the content server(s) 104. This information may replace or supplement the images 120, weights, and item attributes 134 that were previously associated with those items 116.

As the images 120, weights, and item attributes 134 for items 116 included in a container 204 are updated, this updated information may be presented in association with the items 116 to customers 110 via the item interface 108. As a result, the images 120 of the items 116, and the item attributes 134 associated therewith, represent the current appearance, condition, ripeness, etc. of the items 116. Accordingly, by viewing the images 120 of the items 116, customers 110 may determine which of the items 116 are consistent with their individual preferences.

As stated above, the item stocking system 302 may place items 116 in the containers 204 for subsequent imaging, weighing, storage, retrieval, fulfillment, delivery, and/or re-stocking. In various embodiments, the content server(s) 104 may utilize logic and/or one or more algorithms (e.g., machine learning algorithms) to determine which items 116 are to be placed in which containers 204. As noted above, items 116 of the same type and of similar size, condition, ripeness, appearance, etc., may be placed together in a container 204. In some embodiments, the quantity of items 116 to be included/placed in each container 204 may be based on the extent to which customers 110 have viewed, selected, and/or purchased items 116 of varying weights (e.g., customer feedback). For instance, for a particular type of item 116 (e.g., apples), it may be determined that customers 110 more frequently purchase containers 204 including five apples (as opposed to two apples or ten apples), or containers 204 including applies that weigh approximately 2 lbs (as opposed to 0.5 lbs or 3.5 lbs). Accordingly, the service provider 102 may infer that customers 110 prefer a particular quantity (e.g., five) or a particular weight (e.g., 2 lbs) of apples. As a result, when stocking the containers 204 with apples, containers 204 having five apples or having an approximate combined weight of 2 lbs may appear more frequently than other quantities or weights of apples.

Moreover, based on customer interaction with the items 116 via the item interface 108, the service provider 102 may also determine that customers 110 prefer certain items 116 to be packaged or arranged in a particular way. For instance, based on prior viewing/purchasing behavior of customers 110, the service provider 102 may determine that customers 110 generally prefer that watermelons or cantaloupes are either whole, halved or quartered. Or the service provider 102 may determine that customers 110 prefer to purchase bell peppers in packages of three. Accordingly, the service provider 102 may cause the item stocking system 302 to more frequently include three bell peppers in a container 204, or to more frequently include a half watermelon in containers 204. In addition, customer preferences may be based on the time of year. For example, the service provider 102 may determine that a certain weight, style, or packaging of items 116 (e.g., halved watermelons or packages of four ears of corn) is preferred at various times of the year (e.g., around July $4^{th}$).

Figure 4:
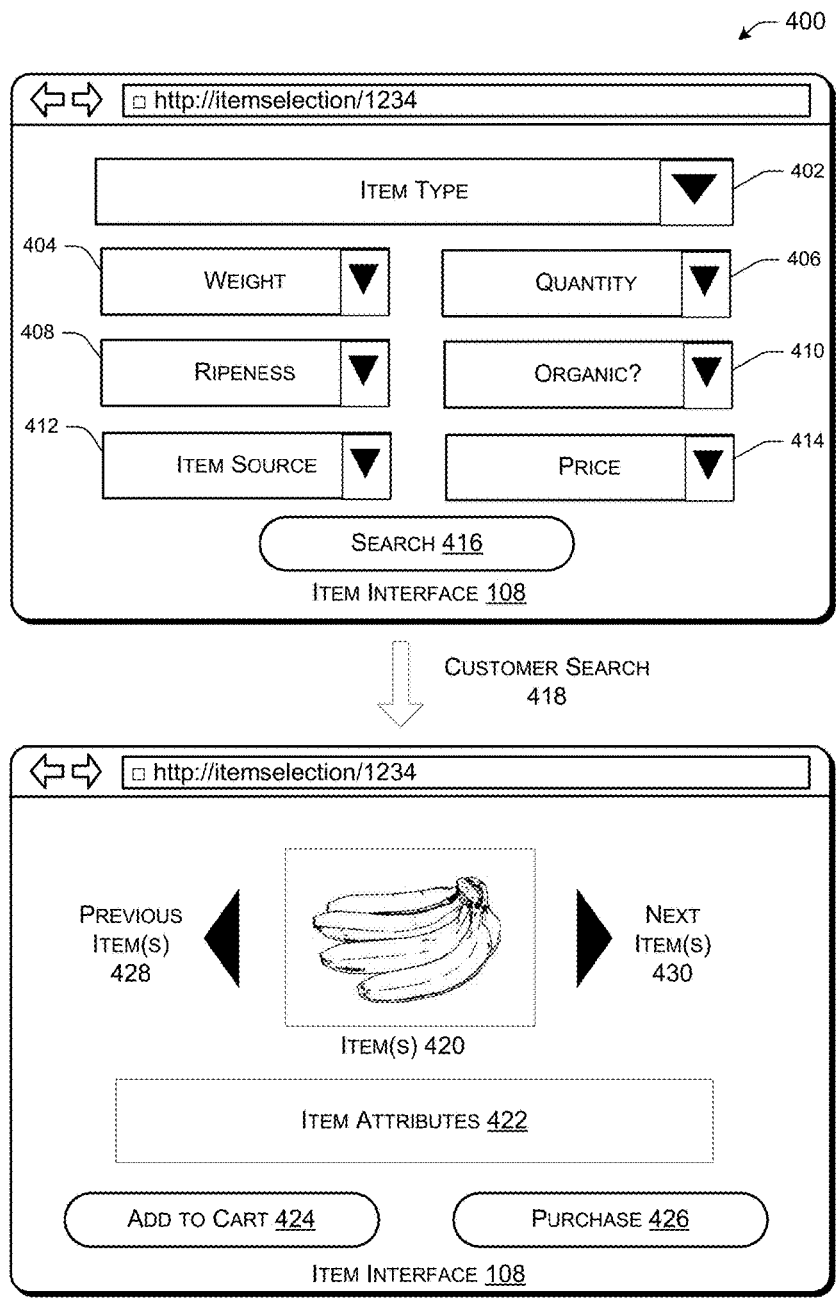
FIG. 4 illustrates an example diagram for enabling the search for, and viewing of, items that are available to be acquired by customers.

FIG. 4 illustrates an example diagram 400 of an item interface that enables customers to search for, view, and/or purchase items provided by a service provider. Initially, the item interface 108 may enable a customer 110 to search for items 116 (e.g., fruit, vegetables, etc.) that he/she would like to purchase. The item interface 108 may include any number of selectable fields that allow the customer 110 to specify an item 116, and various desired attributes relating to the item 116. Although the item interface 108 includes multiple drop down menus, the items 116 available for purchase and information relating to the items 116 may be presented and selected in any manner. For instance, the customer 110 may enter text, select from one or more pre-determined options, a combination thereof, and so on. As shown, the item interface 108 includes a field 402 that allows the customer 110 to identify an item 116 of interest or a type of items 116, such as bananas. Additional fields may include a field 404 for a desired weight of the item 116 (e.g., 0.5 lbs), a field 406 to specify a quantity of the item 116 (e.g., five bananas), and a field 408 that indicates a preferred ripeness of the banana. The ripeness may be item specific and may be represented by text (e.g., not ripe, moderately ripe, ripe, overly ripe, etc.) or a value that indicates the ripeness of the item 116 (e.g., 0.2 for not yet ripe, 0.5 for ideal ripeness, 0.8 for overly ripe, etc.).

The item interface 108 may also include a field 410 in which the customer 110 may specify whether he/she would prefer organic or non-organic items 116. Moreover, the item interface 108 may also include a field 412 for the source of the item 116, which may correspond to a location (e.g., farm, field, orchard, etc.) in which the item was picked or harvested. The item interface 108 may also include a field 414 that indicates the price of the items 116 (e.g., $1.29/lb). The fields show in FIG. 4 are for illustrative purposes only, and may include additional fields by which the customer 110 may filter or specify the particular type of items 116 that he/she would prefer to view. Moreover, aside from selecting the type of item 116 (e.g., bananas), the customer 110 may select or express his/her preferences for some, all, or none of the fields included in the item interface 108. Upon entering the desired amount of information, the customer 110 may search for the desired items 116 by selecting or actuating the search 416 button or icon.

Upon the customer 110 actuating the search 416 command, thereby submitting a customer search 418, the item interface 108 may present responsive information to the customer 110. Since the item attributes 134 of items 116 included in a container 204 may be associated with an image 120 of the items 116, the service provider 102 may identify and display images 120 of items 116 that are responsive to the customer search 418 based on the preferences or criteria specified by the customer 110 that initiated the customer search 418. More particularly, the item interface 108 may present/display one or more images 120 of the item(s) 420 specified by the customer 110, as well as item attributes 420 associated with the item(s) 420. For instance, provided that the customer 110 searched for a particular type of item 420, such as bananas, the item interface 108 may present one or more images 120 of the items 420 (e.g., bananas), where the items 420 depicted in the image(s) 120 are the physical items 420 that are available for purchase. If the customer 110 would like to purchase the items 420 depicted in a particular image 120, the customer 110 may select the "add to cart" 424 option to add the items 420 to a virtual shopping cart, user account, user profile, etc., associated with the customer 110. Instead, the customer 110 may select the "purchase" 426 option to purchase the items 420 at that time. Provided that the customer 110 elects to purchase the items 420 depicted in the image 120, those items 420 actually depicted in the image 120 will be delivered to the customer 110. As a result, the images 120 represent the actual items 116 that are available for purchase.

Moreover, the item attributes 422 may include various types of information relating to the items 420 depicted in the image 120, such as the weight, price per unit (e.g., price per pound, price per item 116, etc.), the total price of the items 420 depicted in the image 120, whether the items 420 are organic/non-organic, a ripeness level of the items 420, the quantity of items 420, the source of the items 420, and/or any other information that would aid the customer 110 in making an informed purchasing decision. The item attributes 422 presented to customers 110 may also include additional information that may allow the customers 110 to make a more informed purchasing decision. Such additional information may include a description of the ripeness of the items 116, such as by stating that an item 116 is not currently ripe, but likely will be ripe in a certain number of days. The item interface 108 may also identify flaws associated with the items 116, such as bruises, scrapes, spots, discoloration, etc., on the surface of fruits or vegetables, and provide a description regarding the flaws. In some cases, potential flaws of the items 116 may not be flaws at all, and may even indicate the ripeness or desirability of the items 116. The item interface 108 may also provide helpful hints regarding uses for items 116 having various levels of ripeness, such as very ripe bananas being a preferred ingredient to make banana bread. In some instances, items 116 that are overly ripe or that are flawed or damaged in some way (e.g., bruises, scrapes, discoloration, etc.) may be discounted to entice customers 110 to purchase items 110 in this condition.

Provided the customer 110 does not want to purchase the items 420 depicted in the image 120, the customer 110 may elect to view additional images 120 of different items 116. For instance, and as shown, the customer 110 may view images 120 of previous items 428 and/or images 120 of next items 430, which may depict different items 116 that are available for purchase by the customer 110. Upon selecting a different item 116, the item attributes 422 associated with those items 116 are presented to the customer 110. As a result, the item interface 108 may allow customers 110 to view an inventory of items 116 that are in stock for purchase. Although the item interface 108 shows that only a single image 120 is presented to the customer 110 at a single time, it is contemplated that multiple images 120 of items 116 may be presented to the customer 110 at the same time, such that the customer 110 may compare and contrast different items 116.

In various embodiments, each image 120 of items 116 displayed to customers 110 via the item interface 108 may correspond to the images 120 captured by the image capture device(s) 118, as illustrated in FIGS. 1-3. Accordingly, each image 120 may depict items 116 included in their corresponding containers 204. Provided that a customer 110 has selected a first group of items 116 (e.g., bananas) depicted in a first image 120 for purchase, the item interface 108 may present various information to the customer 110, such as the weight, overall price, etc., of the items 116. As the customer 110 purchases additional items 116 of the same type, such as the customer subsequently selecting a second group of items 116 (e.g., more bananas) depicted in a second image 120 for purchase, the item interface may update the information presented to the customer 110 to reflect both the first items 116 and the second items 116. That is, the information presented to the customer 110 may include a combined price, a combined weight, etc., of the purchased items 116. For instance, the customer 110 may want two ripe bananas that should be consumed within the next couple days, two less ripe bananas to consume later in the week when they will be ripe, and/or two very ripe bananas that may be used to make banana bread. The customer 110 may view images 120 depicting bananas and select specific bananas that the customer 110 would like to purchase, such as two ripe (yellow) bananas depicted in a first image 120 and two less ripe (greenish) bananas that are depicted in a second image 120. Upon selecting the two images 120 that depict the bananas for purchase, the information presented to the customer 110 may include a combined weight, price, quantity, ripeness levels, etc., of the selected bananas.

In addition, the item interface 108 may allow customers 110 to interact with and/or manipulate the images 120 that depict the items 116 available for purchase. For instance, item interface 108 may present selectable options that allow customers 110 to zoom in or zoom out with respect to the items 116 depicted in the images 120. That way, customers 110 may examine the items 116 in greater detail in order to better determine the condition, quality, ripeness, texture, color, size, shape, etc., of the items 116. The item interface may also provide options to allow customers 110 to manipulate the items 116 depicted in the images 120 in other ways, such as by causing the items 116 to rotate such that the customer 110 can view the items 116 from a different angle or perspective. Moreover, the item interface 108 may allow customers 110 to remove the background of the image 120, such as by removing the container 204 that is holding the items 116, to enhance the boundary of the items 116 so that customers 110 can better differentiate between multiple items 116, and/or to highlight certain portions of the items 116, such as by highlighting various spots, bruises, blemishes, scrapes, etc., that appear on the surface of the items 116.

Either prior to displaying an image 120 that depicts the one or more items 420 (and/or the item attributes 422 associated with those items 420), or at a time at which the image 120 and/or item attributes 422 are presented/displayed to the customer 110, the item interface 108 may cease displaying that image 120 to other customers 110. In particular, based on a determination that the customer 110 has searched for items 116 related to those depicted in the image 120 or the items 420 depicted in the image 120, and/or based on a determination that the customer 110 has requested to view a different image 120, the item identifier of the items 420 may be associated with an account or profile of the customer 110. Upon being presented to the customer 110, the items 420 may be associated with, or reserved for, the customer 110 for a predetermined amount of time (e.g., 5 minutes, 10 minutes, etc.). If the customer 110 selects and/or purchases the items 420, the image 120 of those items 420 will no longer be available via the item interface 108. That is, since the customer 110 has purchased those items 420, the items 420 are no longer available for purchase, and the service provider 102 would not want to give the impression to customers 110 that the items 420 are available for purchase by displaying an image 120 that depicts the items 420. On the contrary, if the customer 110 ceases viewing the image 120, such as by viewing a different image or navigating to a different website (or navigating away from the item interface 108), or if the customer 110 has not selected/purchased the items 420 within the predetermined amount of time, the items 420 will be disassociated from the customer 110, and the item interface 108 may commence to present the image 120 of the items 420 to other customers 110. That is, since the customer 110 is no longer viewing the image 120 and/or because the customer 110 did not purchase the items 420, the items 420 depicted in the image 120 are still available for purchase.

Figure 5:
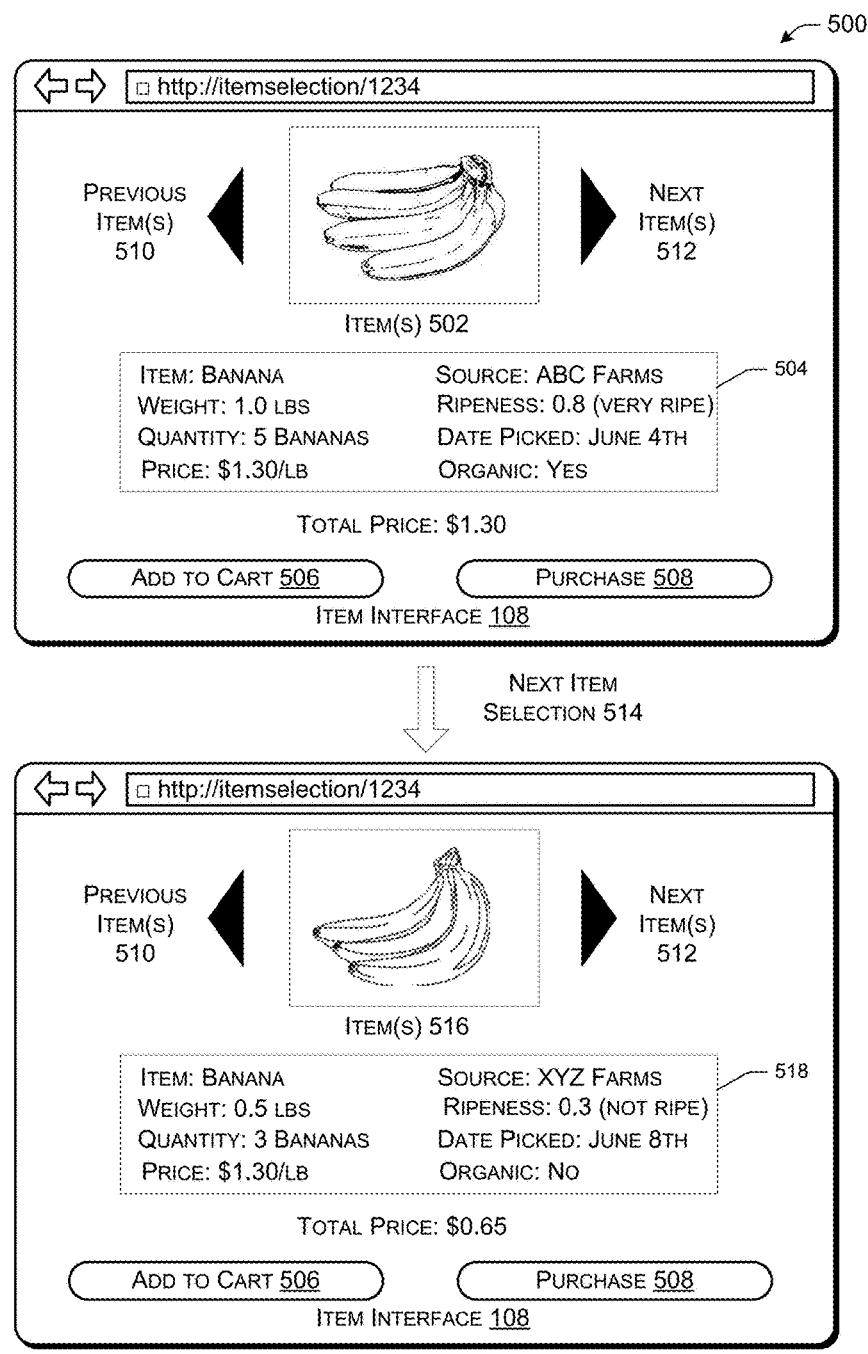
FIG. 5 illustrates an example diagram for displaying multiple different items that are available for acquisition by customers.

FIG. 5 illustrates an example diagram 500 of an item interface that enables customers to search for, view, and/or purchase items provided by a service provider. Similar to the item interface 108 illustrated in FIG. 4, the item interface initially displays an image 120 of one or more items 502 and item attributes 504 associated with the item(s) 502. The image 120 and item attributes 504 of the item(s) 502 may be based on a request from a customer 110. As shown, the image 120 of the item(s) 502 includes a bunch of bananas, where the image 120 was captured by the image capture device(s) 118 and the item(s) 502 were included within a corresponding container 204 when imaged. The item attributes 504 present relevant information that may allow the customer 110 to make a more informed purchasing decision. For instance, the item attributes 504 may include a type of the item(s) 502 (banana), a weight of the item(s) 502 (1.0 lbs), a quantity (5 bananas), a price ($1.30 per lb), a source of the item(s) 502 (ABC Farms), the ripeness of the item(s) 502, which may be a textual description of the ripeness or a value that represents the ripeness (0.8, which corresponds to very ripe), a date in which the item(s) 502 were picked/harvested (June $4^{th}$), and whether the item(s) 502 are organic. The item interface 108 may also indicate a total price of the item(s) 502 ($1.30). However, it is contemplated that any other information relating to the item(s) 502 may be presented to the customer 110.

The item interface 108 may allow the customer 110 to add the item(s) 502 to a cart 506, such as a virtual shopping cart, or purchase 508 the item(s) 502. If the customer 110 does not desire to purchase the item(s) 502, the customer 110 may elect to view images 120 of different items 116, where the different items 116 will also be based on the request submitted by the customer 110. Although multiple images 120 of items 116 may be presented to the customer 110 at the same time, FIG. 5 illustrates that the customer 110 may select one or more previous item(s) 510 or one or more next item(s) 512, which will cause the item interface 108 to display additional images 120 of items 116 that are available for purchase. Upon receiving a next item selection 514 from the customer 110, the item interface 108 may display an image 120 of one or more different items 516 and item attributes 518 associated with the item(s) 516.

As shown, the item attributes 518 associated with the item(s) 516 may be similar, but different from, the item attributes 504 associated with the item(s) 502. For instance, the item attributes may include the type of the item(s) 516 (banana), the weight (0.5 lbs), the quantity (3 bananas), the price ($1.30 per lb), the source of the item(s) 516 (XYZ Farms), the ripeness (0.3, which corresponds to not ripe), the date the item(s) 516 were picked/harvested (June $8^{th}$), and whether the item(s) 516 are organic (no). Accordingly, although the items 116 depicted in the two images 120 are similar (they are both bananas), they do in fact differ. For example, the item(s) 516 have a lesser weight, are fewer in number, are from a different source, are less ripe, were picked/harvested at a later date, and are not organic. As described above, if the customer 110 would like to view different items 116, he/she may select previous items 510 or next items 512. Such a selection may cause the item interface 108 to display an image 120 that depicts different items 116 that are available for purchase and/or item attributes 134 that include information about those items 116. Accordingly, the customer 110 may view different, but similar, items 116 and select specific items 116 that satisfy the customer's 110 preferences. The specific items 116 depicted in the images 120 are the actual items 116 that will be delivered to the customer 110. As stated above, if the customer 110 would like to purchase the item(s) 516, he/she may add the items 516 to a cart 506 or purchase 508 the item(s) 516. Moreover, with each selection of items 116, the combined weight and volume of the same type of items 116 are updated in the cart 506, and/or presented to the customer 110 as the items 116 are selected.

Figure 6:
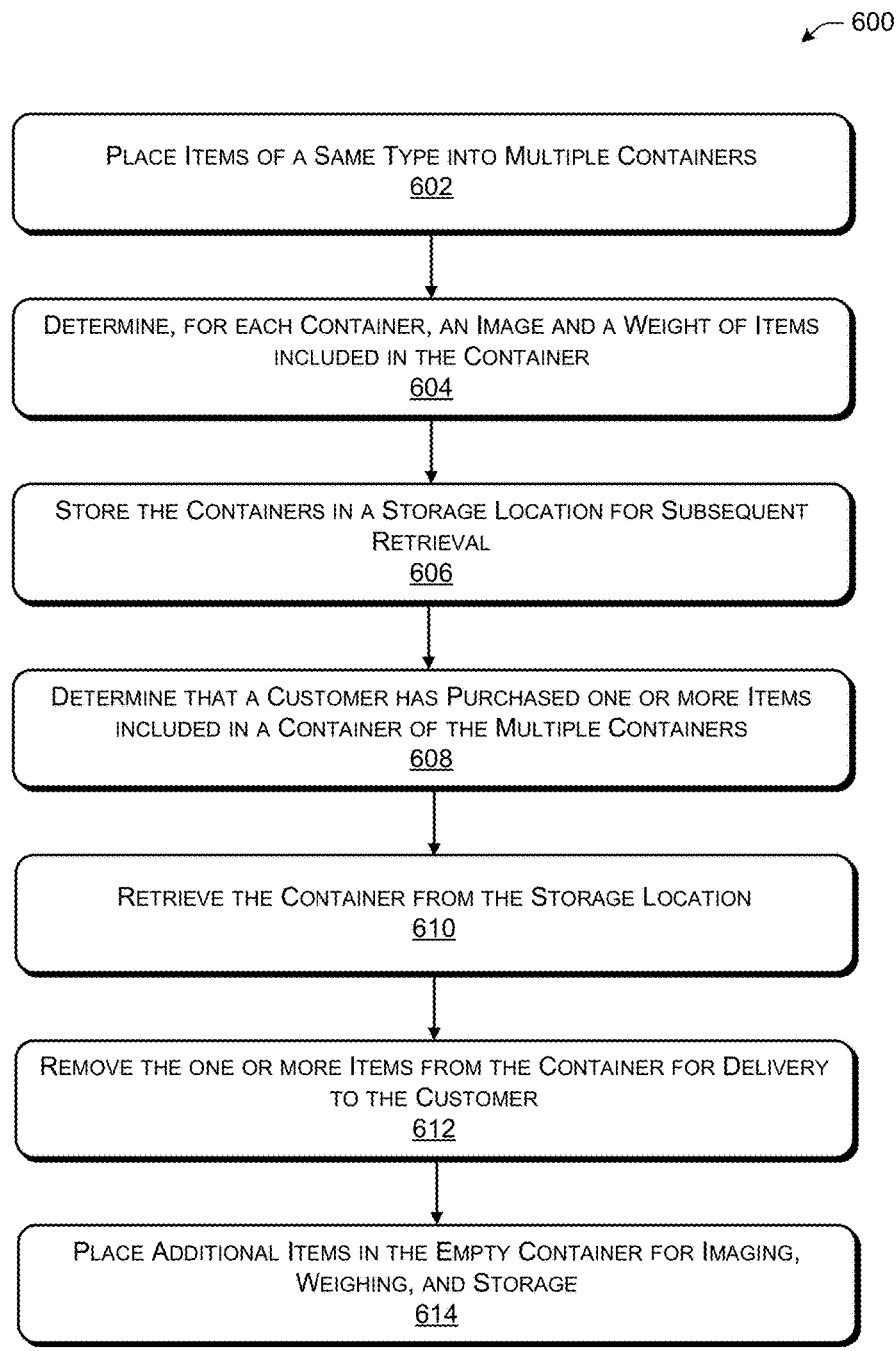
FIG. 6 is a flow diagram illustrating an example process of analyzing, processing, storing, and retrieving items available for acquisition.
Figure 7:
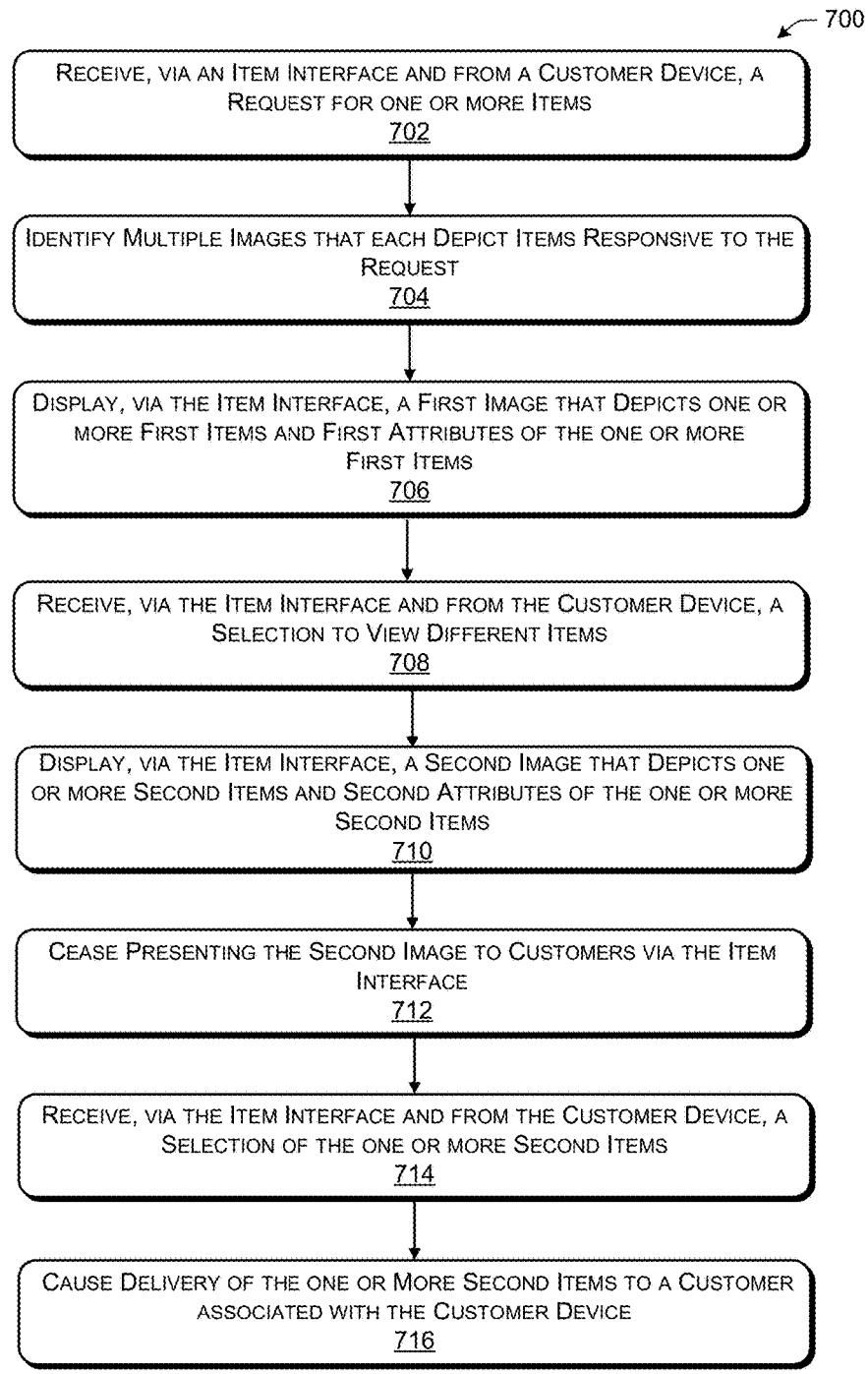
FIG. 7 is a flow diagram illustrating an example process for presenting images that depict items that are available for acquisition by customers.

FIGS. 6 and 7 illustrate example processes of analyzing items available for acquisition and presenting the items to customers via an item interface. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 6 illustrates a flow diagram of an example process 600 of analyzing and processing items that are available to be acquired by customers. Moreover, the following actions described with respect to FIG. 6 may be performed by the service provider 102, the content server(s) 104, and/or the system 200/300, as illustrated with respect to FIGS. 1-5.

Block 602 illustrates placing items of a same type into multiple containers. In particular, items 116 of the same type may be placed in containers 204, where the same type of items 116 included in each container 204 are likely to be of a similar size, shape, ripeness, condition, etc. For instance, bananas of a first size and a first ripeness may be placed in a first container, where bananas of a second size and a second ripeness, which may be different than the first size and the first ripeness, may be placed in a second, different container.

Block 604 illustrates determining, for each container, an image and a weight of items included in the container. In certain embodiments, the containers 204 that include the items 116 may be transported to the item image and attribute determination system 202 via a conveyor system. As each container 204 is moved in proximity to the image capture device(s) 118 and/or the sensor(s) 122, an image of the items 116 included in the container 204 may be captured, and data relating to the items 116 may be obtained. Moreover, the item weighing device(s) 124 may determine the weight of the items 116 included in the container 204. As shown in FIG. 2, the conveyor system may transport each container 204 such that the container is positioned on the item weighing device(s) 124 and below an overhead image capture device 118/sensor 122 device. While the items 116 are being weighed, an image 120 of the items 116 included in the container 204 may be captured. Then, the conveyor system may cause the next container 204 and corresponding items 116 to be imaged and weighed. The images 120, sensor-obtained data, and/or weights associated with the items 116 may be transmitted to the service provider 102 and/or the content server(s) 104.

Block 606 illustrates storing the containers in a storage location for subsequent retrieval. In certain embodiments, the item(s) 116 included in a container 204 may have an item identifier that is associated with a container identifier of the container 204 that holds/transports the item(s) 116. The item identifier and/or the container identifier may be associated with the image 120 of the items 116 and/or the item attributes 134 associated with the items 116. Each container 204 may be stored in the item storage and retrieval system 126. The container identifier of the containers 204 may be associated with a location identifier that corresponds to a location at which the containers 204 are stored for subsequent retrieval.

Block 608 illustrates determining that a customer has purchased one or more items included in a container of the multiple containers. For instance, in response to a search for items 116, the item interface 108 may present images 120 that depict items 116 that are available to be purchased. That is, if the customer 110 elects to purchase items 116 depicted in an image 120, such as by selecting the image 120 or the items 116 depicted in the image 120, the customer 110 will receive those very same items 116 depicted in the image 120. In this embodiment, the customer 110 has purchased such items 116.

Block 610 illustrates retrieving the container from the storage location. Based on the item identifier of the item(s) 116 purchased by the customer 110, the service provider 102 may determine the container identifier of the container 204 that includes the purchased items 116. Then, based on the container identifier, the service provider 102 may determine a location at which the container 204 is currently being stored in the item storage and retrieval system 126. The container 204 may be retrieved and transported using one or more robots, robotic/mechanical arms, lift systems, and/or conveyor systems.

Block 612 illustrates removing the one or more items from the container for delivery to the customer. In various embodiments, the purchased items 116 may be removed from the container 204 and placed in a customer package 308 that will be delivered to the customer 110, resulting in an empty container 204.

Block 614 illustrates placing additional items in the empty container for imaging, weighing, and storage. More particularly, the empty container 204 may be transported, using a conveyor system, to a location at which the containers 204 are filled with items 116. Then, additional items 116 may be placed in the empty container 204, and the container 204 may be imaged, sensed and weighed by the image capture device(s) 118, the sensors 122 and the item weighing device(s) 124, respectively. The container 204 may then be placed in storage, and retrieved once a customer 110 purchases the new items 116 included in the container 204. This process may be repeated for each instance in which a customer 110 purchases items 116 included in one of the containers 204.

FIG. 7 illustrates a flow diagram of an example process 700 of visually presenting images of items that are available for acquisition by customers. Moreover, the following actions described with respect to FIG. 7 may be performed by the service provider 102 and/or the content server(s) 104, as illustrated with respect to FIGS. 1-5.

Block 702 illustrates receiving, via an item interface and from a customer device, a request for one or more items. In various embodiments, a customer 110 may request certain items 116, such as fruits or vegetables (e.g., produce items 116), and also specify preferences for the items 116. Such preferences may include a preferred weight, quantity, ripeness, source, condition, etc., of the items 116. The customer 110 may provide any amount of information with the request, which may be as little as the type of items 116 requested (e.g., bananas). The request may be made via a website, mobile application, etc., associated with the service provider 102.

Block 704 illustrates identifying, multiple images that each depict items responsive to the request. More particularly, based on the request submitted by the customer 110, the service provider 102 may determine images 120 that depict the same type of items 116 requested by the customer 110. Each of the identified images 120 may depict items 116 having an item identifier that corresponds to the type of item 116 included in the customer's 110 request. The items 116 depicted in the images 120 represent specific items 116 that are currently available to be purchased by customers 110, and depict items 116 that were previously imaged and weighed in their corresponding containers 204.

Block 706 illustrates displaying, via the item interface, a first image that depicts one or more first items and first attributes of the one or more first items. For instance, the item interface 108 may display a first image 120 that depicts first items 116 that are likely to be of interest to the customer 110, as well as additional information about the first items 116, such as a weight, quantity, ripeness, freshness, source, and so on. The customer 110 may determine if he/she would like to acquire those specific first items 116 depicted in the first image 120. If so, the customer 110 may select the one or more first items 116 for purchase by selecting the first image 120 or selecting the first items 116 depicted in the image 120.

Block 708 illustrates receiving, via the item interface and from the customer device, a selection to view different items. In some embodiments, the customer 110 may elect to purchase the first item(s) 116. However, provided that the customer 110 does not desire to purchase the one or more first items 116, the customer 110 may elect to view additional images 120 that depict other items 116 that are available for purchase, where the other items 116 are of the same type as the one or first items 116. For instance, the one or more first items 116 may not have satisfied the customer's 110 preferences with respect to weight, quantity, ripeness, source, organic/non-organic, and so on.

Block 710 illustrates displaying, via the item interface, a second image that depicts one or more second items and second attributes of the one or more second items. In various embodiments, the one or more second items 116 may vary from the one or more first items 116 with respect to weight, quantity, ripeness, freshness, source, or any other item attribute 134. As with the first image 120, the one or more second items 116 depicted in the second image 120 are specific items 116 that are available for purchase by the customer 110.

Block 712 illustrates ceasing the presenting of the second image to customers via the item interface. Either prior to, or at a time at which the second image is presented to the customer 110, the service provider 102 may cease presenting the second image 120 to other customers 110. By not allowing multiple customers 110 to view the same items 116 at the same time, the service provider 102 may prevent multiple customers 110 from placing an order for the same physical items 116. The service provider 102 may cease presenting the second image 120 to other customers 110 when it is determined that the item interface 108 will present the second image 120 to the customer 110. This may occur when the customer 110 submits a search for items 116, or when the customer 110 wishes to view a different image 120 of items 116.

Block 714 illustrates receiving, via the item interface and from the customer device, a selection of the one or more second items. If the one or more second items 116 satisfy the customer's preferences, the customer 110 may elect to select the second image 120 via the item interface. The one or more second items 116 may then be added to a cart of the customer 110, and if the customer 110 previously selected items 116 of the same type, the item interface 108 may be updated to reflect the newly selected items 116. That is, the item interface 108 may display information that reflects a combination of the previously selected items 116 and the recently selected one or more second items 116, which may include a combined weight, a combined quantity, a price, etc.

Block 716 illustrates causing delivery of the one or more second items to a customer associated with the customer device. Upon purchase of the one or more second items 116, the one or more second items 116 may be retrieved, packaged, and delivered to a physical location associated with the customer 110 (e.g., a residence, a workplace, etc.). Accordingly, via the images 120 presented via the item interface 108, the customer 110 may view specific items 116 that are available for purchase, and then select the exact items 116 that he/she would like to receive from the service provider 102.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   memory; and
   one or more computer-executable instructions stored in the memory and executable by the one or more processors to perform operations comprising:
   receiving a first image that depicts one or more first produce items, the one or more first produce items depicted in the first image being one or more first physical items that are available for purchase and delivery to customers, each first produce item included in the one or more first produce items being of a first type;
   receiving a second image that depicts one or more second produce items, the one or more second produce items depicted in the second image being one or more second physical items that are available for purchase and delivery to the customers, each second produce item included in the one or more second produce items being of the first type;
   receiving, from a customer device and via a graphical user interface associated with a service provider, a request for a produce item of a second type;
   determining that the second type of the produce item matches the first type;
   displaying, via the graphical user interface, the first image and first attributes associated with the one or more first produce items, the first attributes including the first type of the one or more first produce items, a weight of the one or more first produce items, a price of the one or more first produce items, a quantity of the one or more first produce items, a value that indicates a ripeness of the one or more first produce items, and a source of the one or more first produce items;
   prior to displaying the first image and the first attributes to the customer device, ceasing to display the first image and the first attributes to other customer devices via the graphical user interface;
   receiving, from the customer device and via the graphical user interface, a first selection of the one or more first produce items, the first selection indicating a first intent to purchase the one or more first produce items;
   receiving, from the customer device and via the graphical user interface, a second selection to purchase the one or more first produce items; and
   transmitting an instruction to deliver the one or more first produce items to a physical location of a customer associated with the customer device.

2. The system as recited in claim 1, wherein the operations further comprise:
   adding, based at least partly on the first selection, the one or more first produce items to a virtual shopping cart associated with the customer;
   receiving, from the customer device and via the graphical user interface, a third selection to view an additional image relating to the second type of the produce item;
   displaying, via the graphical user interface, the second image and second attributes associated with the one or more second produce items;
   receiving, from the customer device and via the graphical user interface, a fourth selection of the one or more second produce items;
   adding the one or more second produce items to the virtual shopping cart; and
   displaying, via the graphical user interface, combined attributes associated with the one or more first produce items and the one or more second produce items, the combined attributes including a combined weight, a combined quantity, and a combined price of the one or more first produce items and the one or more second produce items.

3. The system as recited in claim 2, wherein the operations further comprise:
   prior to displaying the second image and the second attributes to the customer device, ceasing to display the second image to the other customer devices via the graphical user interface;
   determining that the customer has not selected or purchased the one or more second produce items within a predetermined amount of time; and
   resuming display of the second image via the graphical user interface to at least one other customer device of the other customer devices.

4. The system as recited in claim 1, wherein the operations further comprise:

receiving, from the customer device and via the graphical user interface, a command to manipulate the first image, the command to manipulate the first image relating to a zoom in with respect to at least one first produce item of the one or more first produce items, a rotation of at least one first produce item of the one or more first produce items, a removal of a background associated with the first image, an enhancement of a boundary associated with at least one first produce item of the one or more first produce items, or a highlight of a portion of the one or more first produce items; and manipulating, via the graphical user interface, the first image based at least partly on the command.

5. The system as recited in claim 1, wherein the first image is captured by a camera and the weight of the one or more first produce items is measured using a weighing scale, at least one of the camera, the weighing scale, or one or more sensors that obtain data relating to items being located at a physical location that is remote from the system.

6. A method comprising:

receiving, from a customer device and via an item interface associated with a service provider, a request for a non-standardized item of a particular type;

causing, via the item interface, display of an image that depicts one or more non-standardized items of the particular type and one or more attributes associated with the one or more non-standardized items, the one or more non-standardized items depicted in the image being available for acquisition by customers, the image comprising one of a plurality of images depicting non-standardized items of the particular type and having respective associated attributes;

prior to displaying the image and the one or more attributes, ceasing to display the image and the one or more attributes via the item interface to other customer devices;

receiving, from the customer device and via the item interface, a selection of the one or more non-standardized items, the selection indicating an intent to purchase the one or more non-standardized items; and transmitting an instruction to deliver the one or more non-standardized items to a physical location associated with the customer device.

7. The method as recited in claim 6, further comprising:

adding the one or more non-standardized items to a virtual shopping cart of a customer associated with the customer device;

receiving, from the customer device and via the item interface, a second selection to view an additional image relating to the particular type;

displaying, via the item interface, a second image that depicts one or more second non-standardized items and one or more second attributes associated with the one or more second non-standardized items;

receiving, from the customer device and via the item interface, a third selection of the one or more second non-standardized items;

adding the one or more second non-standardized items to the virtual shopping cart; and displaying, via the item interface, combined attributes associated with the one or more non-standardized items and the one or more second non-standardized items, the combined attributes including a combined weight, a combined quantity, and a combined price of the one or more non-standardized items and the one or more second non-standardized items.

8. The method as recited in claim 6, wherein the one or more non-standardized items are a fruit or a vegetable, and wherein the one or more attributes of the one or more non-standardized items further include at least one of a weight of the one or more non-standardized items, a value or text that indicates a ripeness of the one or more non-standardized items, a price of the one or more non-standardized items, a quantity of the one or more non-standardized items, a source of the one or more non-standardized items, an indication of whether the one or more non-standardized items are organic, or a time at which the one or more non-standardized items were picked or harvested.

9. The method as recited in claim 8, further comprising causing display of a second image that depicts one or more second non-standardized items of the particular type and one or more second attributes associated with the one or more second non-standardized items, the one or more second attributes indicating a second weight of the one or more second non-standardized items that is different than the weight of the one or more non-standardized items and a second ripeness of the one or more second non-standardized items that is different than the ripeness of the one or more non-standardized items.

10. The method as recited in claim 6, further comprising:

receiving, from the customer device and via the item interface, a second request to view additional non-standardized items of the particular type;

causing, via the item interface, display of a second image that depicts one or more second non-standardized items of the particular type and one or more second attributes associated with the one or more second non-standardized items;

prior to displaying the second image and the one or more second attributes or at a time at which the second image and the one or more second attributes are displayed via the item interface, ceasing to display the second image and the one or more second attributes via the item interface to the other customer devices;

at least one of:

determining that a customer associated with the customer device has not selected or purchased the one or more second non-standardized items within a predetermined amount of time; or determining that the customer has navigated away from the item interface that displays the second image and the one or more second attributes; and resuming display of the second image and the one or more second non-standardized items via the item interface to at least one other customer device of the other customer devices.

11. The method as recited in claim 6, further comprising presenting, via the item interface, one or more selectable options to filter images that are to be displayed via the item interface, the one or more selectable options relating to at least one of a type of non-standardized items, a weight of non-standardized items, a quantity of non-standardized items, a price of non-standardized items, a ripeness of non-standardized items, a source of non-standardized items, or an age of non-standardized items.

12. The method as recited in claim 6, further comprising, based at least partly on the request, presenting, via the item interface, multiple images that each depict at least one non-standardized item of the particular type.

13. A system comprising:
one or more processors;
memory; and
one or more computer-executable instructions stored in the memory and executable by the one or more processors to perform operations comprising:
  receiving, from a customer device and via an item interface associated with a service provider, a request for a non-standardized item of a particular type;
  causing, via the item interface, display of an image that depicts one or more non-standardized items of the particular type and one or more attributes associated with the one or more non-standardized items;
  prior to displaying the image and the one or more attributes, ceasing to display the image and the one or more attributes via the item interface to other customer devices; and
  receiving, from the customer device and via the item interface, a selection of the one or more non-standardized items, the selection indicating an intent to purchase the one or more non-standardized items.

14. The system as recited in claim 13, wherein the operations further comprise:
  adding the one or more non-standardized items to a virtual shopping cart of a customer associated with the customer device;
  receiving, from the customer device and via the item interface, a second selection to view an additional image relating to the particular type;
  displaying, via the item interface, a second image that depicts one or more second non-standardized items and one or more second attributes associated with the one or more second non-standardized items;
  receiving, from the customer device and via the item interface, a third selection of the one or more second non-standardized items;
  adding the one or more second non-standardized items to the virtual shopping cart; and
  displaying, via the item interface, combined attributes associated with the one or more non-standardized items and the one or more second non-standardized items, the combined attributes including a combined weight, a combined quantity, and a combined price of the one or more non-standardized items and the one or more second non-standardized items.

15. The system as recited in claim 13, wherein the operations further comprise presenting, via the item interface, one or more selectable options to filter images that are to be displayed via the item interface, the one or more selectable options relating to at least one of a type of non-standardized items, a weight of non-standardized items, a quantity of non-standardized items, a price of non-standardized items, a ripeness of non-standardized items, a source of non-standardized items, or an age of non-standardized items.

16. The system as recited in claim 13, wherein the one or more non-standardized items depicted in the image are available for acquisition by customers.

17. The system as recited in claim 13, wherein the operations further comprise, based at least partly on the request, presenting, via the item interface, multiple images that each depict at least one non-standardized item of the particular type.

18. The system as recited in claim 13, wherein the image comprises one of a plurality of images depicting non-standardized items of the particular type, the non-standardized items having respective associated attributes.

19. The system as recited in claim 13, wherein the operations further comprise:
  receiving, from the customer device and via the item interface, a second request to view additional non-standardized items of the particular type;
  causing, via the item interface, display of a second image that depicts one or more second non-standardized items of the particular type and one or more second attributes associated with the one or more second non-standardized items;
  prior to displaying the second image and the one or more second attributes or at a time at which the second image and the one or more second attributes are displayed via the item interface, ceasing to display the second image and the one or more second attributes via the item interface to the other customer devices;
  at least one of:
    determining that a customer associated with the customer device has not selected or purchased the one or more second non-standardized items within a predetermined amount of time; or
    determining that the customer has navigated away from the item interface that displays the second image and the one or more second attributes; and
  resuming display of the second image and the one or more second non-standardized items via the item interface to at least one other customer device of the other customer devices.

20. The system as recited in claim 13, wherein the operations further comprise transmitting an instruction to deliver the one or more non-standardized items to a physical location associated with the customer device.

* * * * *